US008310986B1

United States Patent
Gormley et al.

(10) Patent No.: US 8,310,986 B1
(45) Date of Patent: Nov. 13, 2012

(54) SYSTEMS AND METHODS FOR HYBRID DATA RATE SCHEDULING BASED ON MODULATION AND CODING SCHEMES

(75) Inventors: Eamonn F. Gormley, Redmond, WA (US); Jeffrey Paul Harrang, Sammamish, WA (US)

(73) Assignee: Eden Rock Communications, Bothell, WA (US)

( * ) Notice: Subject to any disclaimer, the term of this patent is extended or adjusted under 35 U.S.C. 154(b) by 440 days.

(21) Appl. No.: 12/485,322

(22) Filed: Jun. 16, 2009

Related U.S. Application Data (60) Provisional application No. 61/088,262, filed on Aug. 12, 2008.

(51) Int. Cl.
*H04W 4/00* (2009.01)
(52) U.S. Cl. .......................... 370/328; 370/230
(58) Field of Classification Search .......... 370/310–350, 370/230–234; 455/101, 110–113, 23, 422, 455/450–455, 67.11–67.13, 115.1; 375/267, 375/260, 295–315
See application file for complete search history.

(56) References Cited

U.S. PATENT DOCUMENTS

| | | | |
|---|---|---|---|
| 2002/0044527 A1* | 4/2002 | Jiang et al. | 370/229 |
| 2007/0147405 A1* | 6/2007 | Kuurne | 370/412 |
| 2007/0206623 A1* | 9/2007 | Tiedemann et al. | 370/431 |
| 2010/0260043 A1* | 10/2010 | Kimmich et al. | 370/229 |

* cited by examiner

*Primary Examiner* — Kwang B Yao
*Assistant Examiner* — Kenan Cehic (57) ABSTRACT

In a data communications system a scheduler device and multiple client devices communicate with each other over a data communications network. The scheduler device assigns a portion of the system's client devices one or more data rate multiplier values that individually affect a maximum throughput associated with their respectively assigned modulation and coding scheme (MCS). The data rate multiplier value assignment is selected by the scheduler device based on a type MCS or a signal interference plus noise ratio (SINR) value. The assigned data rate multiplier values may result in a hybrid throughput scheduling scenario amongst the client devices.

10 Claims, 5 Drawing Sheets

SYSTEMS AND METHODS FOR HYBRID DATA RATE SCHEDULING BASED ON MODULATION AND CODING SCHEMES

CROSS REFERENCE TO RELATED APPLICATIONS

The present application claims the benefit of U.S. Provisional Application No. 61/088,262, filed Aug. 12, 2008.

FIELD OF THE INVENTION

The present invention generally relates to systems and methods for applying hybrid modulation and coding scheme (MCS) throughput assignments to communications channels within a data communications network. A weighted MCS throughput assignment is implemented based on an application of a customized data rate multiplier lookup table that is associated with either MCS or Signal Interference plus Noise Ratio (SINR) threshold values. Preferred quality of service metrics for portions of a network communications channel can be factored into a particular data rate multiplier lookup table's execution.

BACKGROUND OF THE INVENTION

Wireless data communication networks today typically involve data transmission of modulated information signals from one or more network controller devices to one or more wireless client devices, and back, over various types of wireless communications links. In order to maximize the amount of information transferred in the presence of signal fading and signal interference, most modern wireless communications networks employ multiple levels of modulation as well as multiple coding rates that are dynamically selected based on the levels of signal fading or signal interference.

Typical modulation schemes include Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). These modulation schemes may be assigned to data communications between individual client devices and network controller devices (e.g., network cell basestations). As would be understood by those skilled in the art, the higher a modulation order the more data that can be carried over a communications link (measured in terms of bits/data symbol or bits per second).

As communication link bandwidth largely depends on symbol rate and not bit rate, it is advantageous to increase the bit rate per symbol, when feasible, to increase channel throughput. Typically, this can be accomplished by implementing a higher order of modulation (e.g., switching from BPSK to 16-QAM) for each symbol. However, for each additional bit encoded in a data symbol, the symbol states become less distinct from each other. This can make it more difficult, if not impossible, for a receiver to detect a symbol correctly, particularly in the presence of signal interference.

A Signal to Interference plus Noise Ratio (SINR) is the ratio of the received strength of a desired signal (e.g., a directed basestation pilot signal) to the received strength of undesired signals such as noise and interference. Generally, the better the SINR, the higher the modulation order that can be employed and that greater the throughput that can be achieved over a particular network communications link. Accordingly, within most modern data communications networks, there exist multiple SINR thresholds between which only specific modulation levels can be efficiently employed.

Further, in order to achieve a more stable throughput under particular SINR scenarios it is important for data communications systems to employ multiple coding rates. Predesignated coding rates offer a desired level of system redundancy (e.g., error correction and stability) for each level of modulation implemented over a network communications link.

As one example, a network controller may assign a portion of client devices operating in close vicinity to a network basestation to transmit and receive data using a 64-QAM modulation level. To ensure a desired level of redundancy (e.g., in the presence of interference) the network controller may designate the 64-QAM modulation to be encoded at a half rate (i.e., 64-QAM 1/2), resulting in a throughput of 3 bits/symbol with an acceptably low bit error rate instead of a throughput of 6 bits/symbol with an unacceptably high bit error rate. The employment of error correction coding ensures that the communicating portion of client devices will receive a desired quality of service (QOS) in accordance with the half rate coding scheme. QOS metrics affected by interference or signal fading may include, but are not limited to, communications quality, queuing delay, information loss, dropping existing network sessions, blocking new network sessions, etc.

In general, the closer a client device is to a network basestation within a coverage area, the better the SINR the client device will achieve. This is because the client device generally receives a stronger signal with less interference the closer it is to the base station. In contrast, the closer a client device is to an edge of a coverage area or the further away a client device is from the nearest network basestation, the weaker a signal and greater the level of interference the client device will receive and the worse the SINR the client device will achieve.

Typically, when end users subscribe to a data communications service on a wireless data communication network (e.g., packet-switched networks), they enter into a service agreement with a network service provider which specifies the QOS that they will achieve on the network. One of the most crucial parameters of a QOS agreement is the data throughput a client device should achieve. In theory, it would be most beneficial to a client if their achievable throughput were independent of the type or level of MCS employed. Unfortunately, this is not always possible or even desirable, because when a client device is using a lower order MCS, they consume much more communication link bandwidth than when they are using a higher order MCS.

For example, the transfer of a data packet using BPSK (1 bit/symbol) requires six times the amount of bandwidth that the transfer the same data packet requires when using 64-QAM (6 bits/symbol). When network bandwidth is limited or when congestion occurs on the link, it is not always optimal to limit throughput to clients already using the least amount of bandwidth (e.g., clients using 64-QAM modulation) so that clients already consuming the most bandwidth (e.g., clients using BPSK modulation) can achieve a slightly higher throughput.

If a network controller device, having a packet data scheduler, provided for an equal-throughput scenario amongst all client devices in a network cell, the collective throughput of the system would be lower than a network controller device, having a packet data scheduler that provided for an equal-bandwidth scenario amongst all client devices in a network cell. However, under an equal-bandwidth scenario, users of lower order MCS may receive a disproportionately low throughput compared with users of higher order MCS.

By way of example, Table 1 illustrates various modulation distributions that could be seen on a particular wireless network under both an equal-throughput and an equal-bandwidth scheduling scenario for the same set of network devices. This example presumes a network coverage area of fixed size having a large population of client devices distributed in a uniformly random fashion.

TABLE 1

| Modulation and Coding Scheme | Percentage of CPE on channel using Modulation and coding scheme | Channel modulation distribution: Equal-Bandwidth Scheduling | Channel modulation distribution: Equal-Throughput Scheduling |
| --- | --- | --- | --- |
| QPSK-1/2 x6 | 0.96% | 0.96% | 9.5% |
| QPSK-1/2 x4 | 2.82% | 2.82% | 18.6% |
| QPSK-1/2 x2 | 4.78% | 4.78% | 15.7% |
| QPSK 1/2 | 7.15% | 7.15% | 11.8% |
| QPSK 3/4 | 7.78% | 7.78% | 8.5% |
| 16-QAM 1/2 | 13.01% | 13.01% | 10.7% |
| 16-QAM 3/4 | 15.98% | 15.98% | 8.8% |
| 64-QAM 2/3 | 7.63% | 7.63% | 3.1% |
| 64-QAM 3/4 | 7.01% | 7.01% | 2.6% |
| 64-QAM 5/6 | 32.88% | 32.88% | 10.8% |

The percentage of CPE using each modulation and coding scheme is shown in the second column of Table 1. In the equal-bandwidth scheduling scenario of Table 1, the modulation distribution on the channel is the same as the modulation distribution of all the distributed client devices. For example, 32.88% of the client devices use a 64-QAM 5/6 MCS, so 32.88% of the channel bandwidth is consumed by the 64-QAM 5/6 users. At the other end of the scale, only 0.96% of the users require QPSK-1/2×6 MCS (QPSK-1/2 with a repetition factor of 6, equivalent to an overall MCS of QPSK-1/12), and therefore only 0.96% of the channel bandwidth is consumed by those users.

In the equal-throughput scheduling scenario of Table 1, the scheduler assigns equal-throughput to all distributed client devices on the channel. However, the MCS distribution seen on the channel is significantly different than the distribution of MCS amongst the client devices. For example, even though only 0.96% of the client devices use a QPSK-1/2×6 MCS, they are consuming 9.5% of the channel bandwidth. The client devices using a 64-QAM 5/6 MCS utilize the channel more efficiently, but they only receive 10.8% of the channel bandwidth. Considering at least the above tradeoffs, neither an equal-throughput nor an equal-bandwidth scheduling scenario offers an ideal, flexible solution to real-world data rate scheduling problems experienced by most network service providers.

Therefore, there continues to be a need for improved data communications systems and methods that employ hybrid modulation and coding scheme (MCS) throughput assignments to communications channels within a data communications network. It would be beneficial if these hybrid scheduling schemes offered real-world solutions that would benefit the collective users of a particular network data communications channel. It would also be beneficial if these improved systems and methods provided for easy modification of the hybrid scheduling schemes in accordance with a particular service provider's QOS objectives.

SUMMARY OF THE INVENTION

In overcoming the above disadvantages associated with modern data communication systems, a data communications system in accordance with the present invention includes, but is not limited to, one or more scheduler devices and multiple client devices in data communications with each other over a data communications network. The scheduler device(s) is configured to assign a portion of the client devices one or more data rate multiplier values that affect a maximum throughput associated with one or more modulation and coding scheme (MCS).

In accordance with another aspect of the present invention, an assigned data rate multiplier value is selected by the scheduler device based on a type of MCS.

In accordance with a further aspect of the present invention, an assigned data rate multiplier value is selected by the scheduler device based on a signal interference plus noise ratio (SINR) value.

In accordance with yet another aspect of the present invention, the portion of the client devices comprises every client device in a network cell of the data communications system.

In accordance with yet a further aspect of the present invention, an assignment of data rate multiplier values for the portion of the client devices results in neither an equal-throughput nor an equal-bandwidth scheduling scenario.

In accordance with another aspect of the present invention, a first group of client devices of the portion of the client devices using a first group of MCS's are assigned data rate multiplier values that result in an equal-throughput scheduling scenario amongst the first group of client devices and a second group of client devices of the portion of the client devices using a second group of MCS's are assigned data rate multiplier values that result in an equal-bandwidth scheduling scenario amongst the second group of client devices.

In accordance with yet another aspect of the invention is a computer-readable medium encoded with computer readable instructions, which when executed, perform a processes for communicating data in accordance with one or more modulation and coding scheme (MCS) from one or more scheduler device to multiple client devices over a data communications network and assigning data rate multiplier value(s) that affect a maximum throughput associated with the MCS to a portion of the client devices.

In accordance with yet a further aspect of the invention, is a computer-implemented process for communicating data in accordance with one or more modulation and coding scheme (MCS) from one or more scheduler device to multiple client devices over a data communications network and assigning data rate multiplier value(s) that affect a maximum throughput associated with the MCS to a portion of the client devices.

DESCRIPTION OF THE DRAWINGS

Preferred and alternative examples of the present invention are described in detail below with reference to the following Figure drawings.

DETAILED DESCRIPTION

Figure 1A:
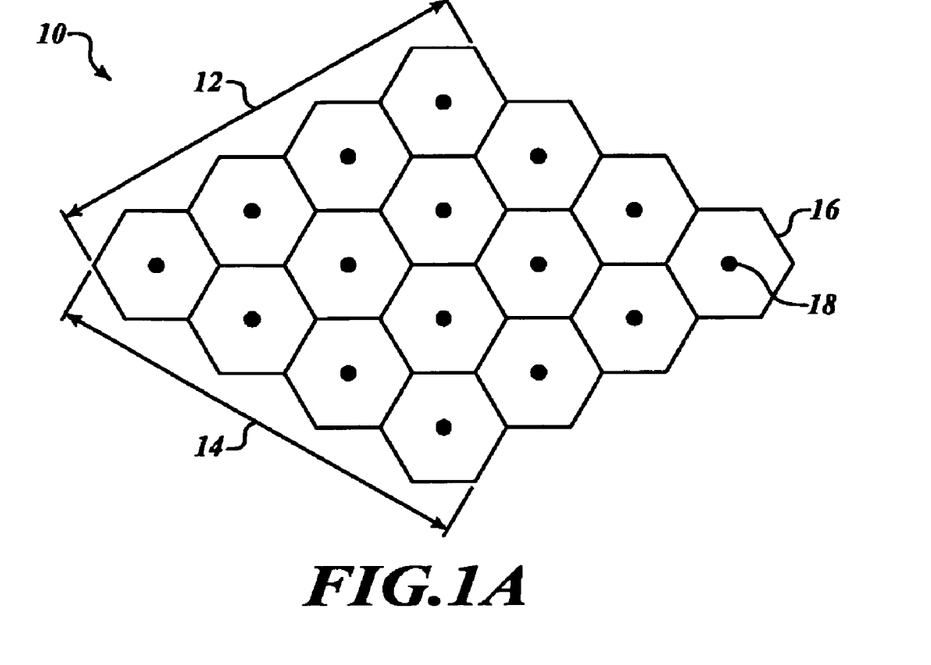
FIG. 1A illustrates a high-level network topology of a data communications system in accordance with an embodiment of the present invention.
Figure 1B:
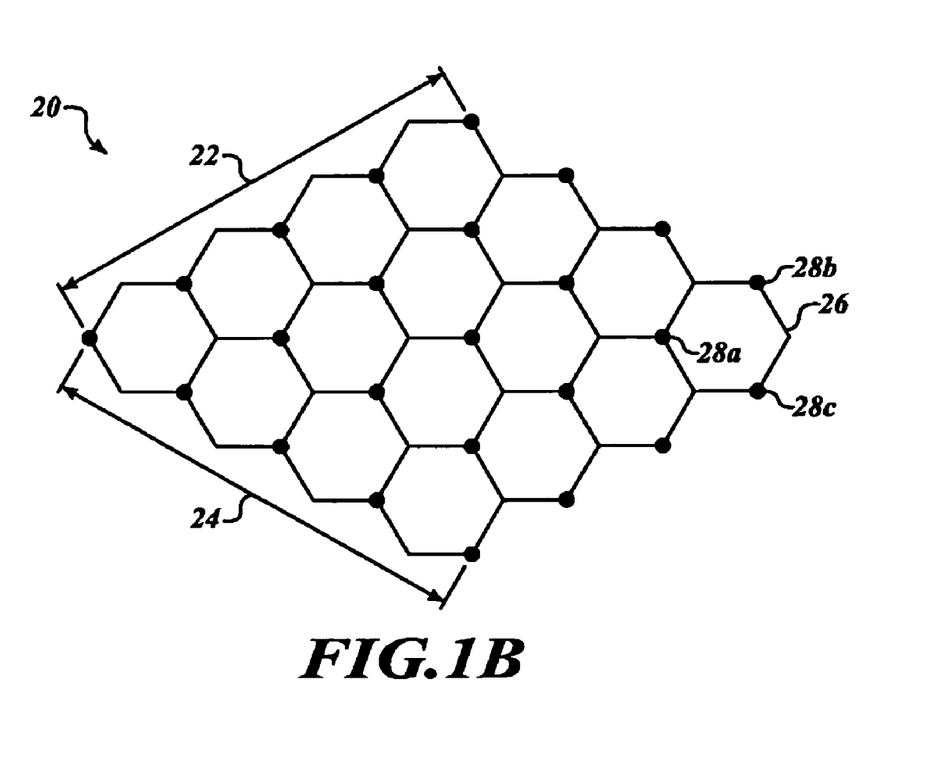
FIG. 1B illustrates a high-level network topology of a data communications system in accordance with another embodiment of the present invention.

In accordance with an exemplary embodiment of the present invention, FIG. 1A depicts a high-level view of wireless network deployment showing a network sector 10 that is four hexagonal cells 12 high and four hexagonal cells 14 wide. The size, number of cells, and arrangement of the network sector 10 is not crucial to the functionality of the present invention and may vary substantially amongst different wireless network topologies. Those skilled in the art would realize that the hexagonal cells 16 and network sector 10 depicted in FIGS. 1A-B are industry standard representations commonly utilized to represent various cellular network topologies at the engineering level. The hexagon shape is an idealized representation of the overlapping circles of basestation coverage areas in a clean two-dimensional form where the coverage areas between adjoining cells are theoretically equal. In practice, cell coverage areas typically vary in size amongst urban, suburban, and rural regions. For example, rural cells may be designed to have ten to fifty times the coverage area of urban area cells.

In an embodiment, each network cell 16 within the network sector 10 may comprise a single controller device 18 (e.g., a network basestation) that is configured to offer wireless communications service (e.g., cellular phone service) to many different client devices (not shown) distributed within the boundaries of the network cell 16. After a client device passes outside the boundaries of the network cell 16, the wireless communications services may be handed over to a basestation of a neighboring network cell or they may be discontinued if the client device passes into a non-service area.

Although the wireless network sector 10 of FIG. 1A offers a simple, easily-understandable network topology where one controller device 18 independently provides all wireless communication services for client devices within a specific network cell 16, most modern wireless networks have multiple controller devices which can independently or jointly cover the same regions within a particular network cell. In accordance with an embodiment of the present invention, FIG. 1B depicts another high-level view of a wireless deployment 20 that is four hexagonal cells 22 high and four hexagonal cells 24 wide. In this wireless deployment 20, each network cell 26 has three network controller devices 28a-c (e.g., basestations) symmetrically positioned around the boundary region of the network cell 26. The network controller devices 28a-c each may provide channel-directed services to the same portions of the network cell 26, thereby offering more coverage support and redundancy in the presence of communications service failures and network interference. One skilled in the art would realize that each wireless deployment 20 utilizes multiple network channel frequencies that may be reused within other cells of the network sector 20 in such a way as to limit the levels of interference between channel frequencies of adjoining network cells. Further, within a particular network cell 26, multiple channel frequencies may be employed to offer improved bandwidth amongst client devices (not shown) within heavily populated network sectors.

Figure 2:
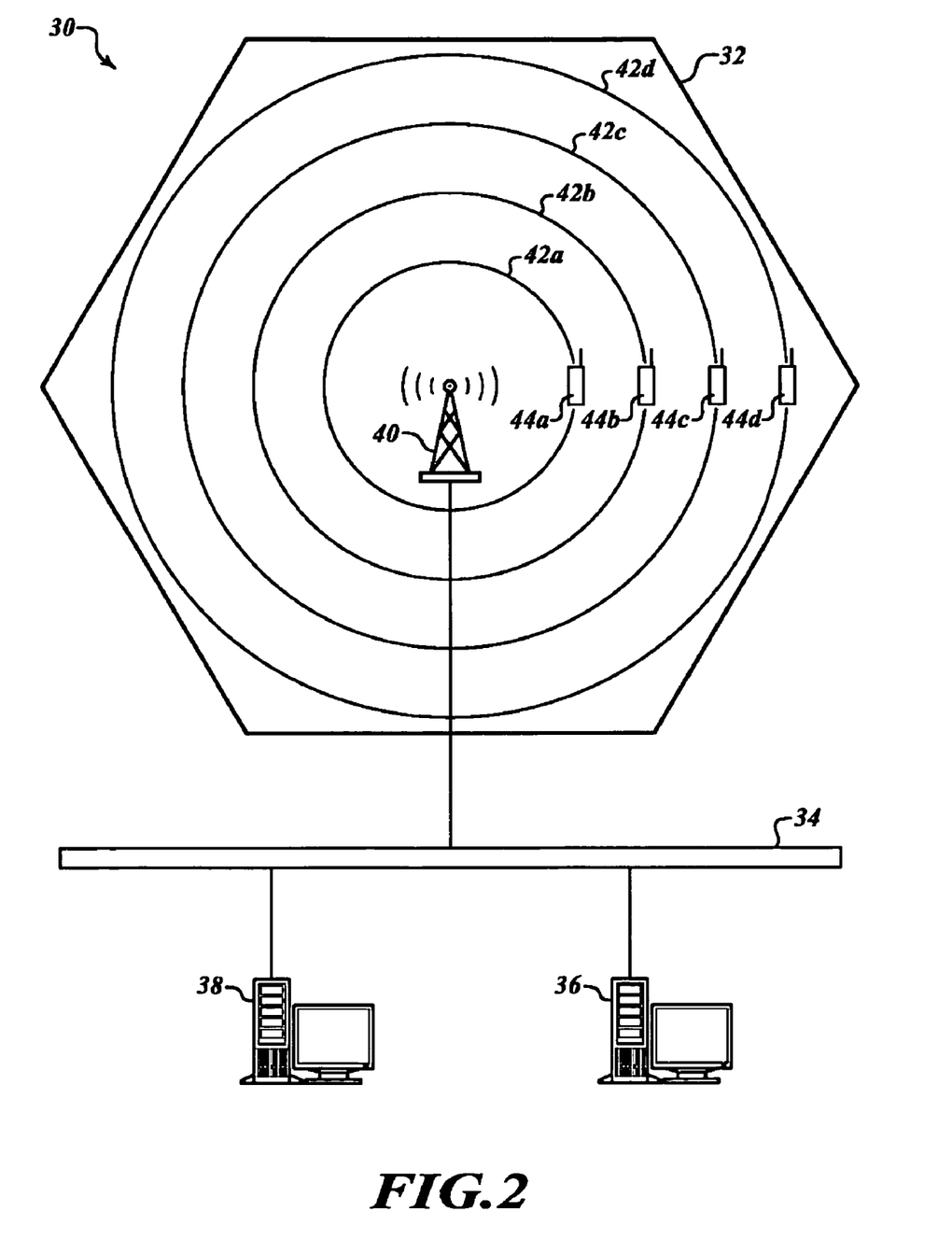
FIG. 2 illustrates the data communications of one network cell in accordance with an embodiment of the present invention.

In accordance with one embodiment of the present invention, FIG. 2 illustrates a portion of a communications network sector 30 depicting an isolated network cell 32, a backhaul network 34 that may be comprised of both wireline and wireless network components, and multiple network controller devices 36, 38 (e.g., network switching centers and/or network schedulers) connected to a network basestation 40 through the backhaul network 34. The isolated network cell 32 includes multiple distributed client devices 44a-d positioned along various concentric threshold rings 42a-d, each having a predetermined radial distance from the servicing network basestation 40. In an embodiment, the first threshold ring 42a (nearest to the basestation 40) encompasses an area in which communications using 64-QAM modulation (having 4-6 bits/symbol, depending on a designated coding rate) is feasible; the area between the first 42a and second threshold ring 42b encompasses an area in which communications using 16-QAM modulation (having 2-4 bits/symbol, depending on a designated coding rate) is feasible; the area between the second 42b and third threshold ring 42c encompasses an area that in which communications using QPSK modulation (having 1-2 bits/symbol, depending on a designated coding rate) is feasible; and the area between the third 42c and fourth threshold ring 42d encompasses an area in which communications using BPSK modulation (having less than or equal to 1 bits/symbol, depending on a designated coding rate) is feasible.

In an embodiment, a service provider may first determine a Signal to Interference plus Noise Ratio (SINR) for each client device 44a-d in the network cell 32 by comparing client measurements of pilot signals with client measurements of noise and interference. The SINR values for each client device may then be used to determine a desired Modulation and Coding Scheme (MCS) for each client device 44a-d. Under this scenario, the network service provider may employ one or more of the network controllers devices 36, 38 or the cell basestation 40 to designate the first client device 44a to use a 64-QAM modulation level based on its SINR, the second client device 44b to use a 16-QAM modulation level based on its SINR, the third client device 44c to use a QPSK modulation level based on its SINR, and the fourth client device 44d to use a BPSK modulation level based on its SINR. Threshold SINR levels may generally correspond with the radial distances between the concentric threshold rings 42a-d and the network basestation 40 (due to increased levels of fading and interference).

In an embodiment, the network controller devices 36, 38 may be configured to communicate with the network basestation 40 via a wireline backhaul network 34. In another embodiment, the network controller devices 36, 38 may be configured to communicate with the network basestation 40 via a wireless backhaul network (not shown). Further, the basestation 40 may be configured to communicate with the distributed client devices 44a-d via any well-known wireless airlink communications technology. The network controller devices 36, 38, the network basestation 40, and the distributed client devices 44a-d may be configured to run any known operating system, including but not limited to, Microsoft Windows™, Mac OS™, Linux™, Unix™, or any common mobile operating system, including Symbian™, Palm™, Windows Mobile™, Mobile Linux™ MXI™, etc. In an embodiment, the distributed client devices 44a-d may include any combination of mobile computing devices, having wireless communications capabilities (e.g., cellular phones, PDAs, e-books, ultra-portable computers, etc.).

In an embodiment, the backhaul network 34 may include, but is not limited to, any of the following communications technologies: optical fiber, coaxial cable, twisted pair cable, Ethernet cable, power-line cable, and any microwave point-to-point technology known in the art. In an embodiment, the network basestation(s) 40 may be configured to communicate with the distributed client devices 44a-d via any Cellular Data Communications Protocol, including any common GSM, UMTS, WiMAX or LTE protocol.

The network controller devices 36, 38, the network basestation 40, and the distributed client devices 44a-d may also include standard computing software and hardware necessary for processing, storing, and communicating data amongst each other within a data communications network 30. The computing hardware may include, but is not limited to, one or more processors, volatile and non-volatile memories, user interfaces, and wireline and/or wireless communications transceivers.

In an embodiment, a network controller device, including network controller devices 36, 38 and basestation 40 may include a computer-readable medium (e.g., any common volatile or non-volatile memory type) encoded with a set of computer readable instructions, which when executed, performs one or more control processes associated with the data rate scheduling processes of the present invention.

In an alternate embodiment, the invention may be implemented in a purely wireline or in any combined wireline/wireless communications network that employs multiple levels of modulation and coding (e.g., networks employing cable packet data systems). In these embodiments, one or more control processes associated with the data rate scheduling processes of the present invention may be communicated between a data rate scheduler and any number of wireline client devices communicating over one or more designated wireline network communications links.

Figure 3:
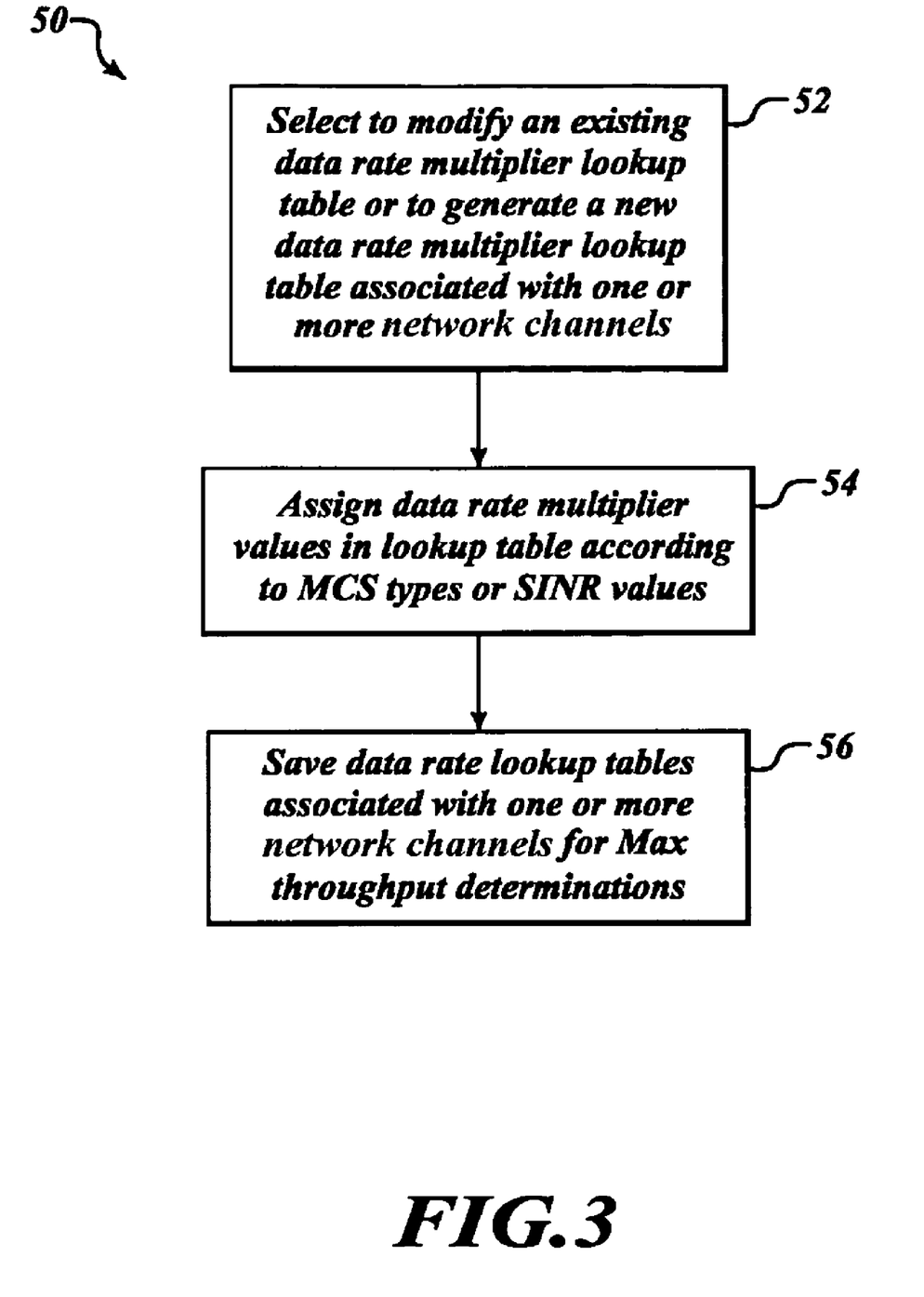
FIG. 3 illustrates a data rate multiplier lookup table flowchart process in accordance with an embodiment of the present invention.

FIG. 3 illustrates a data rate multiplier lookup table flowchart process 50 in accordance with an exemplary embodiment of the present invention. At block 52 a selection is made to either modify an existing data rate multiplier lookup table or to generate a new data rate multiplier lookup table associated with one or more communications channels of a wireless data communications network. In an embodiment, this process may be performed by a network controller device having data rate scheduling capabilities, including any of the network controller devices 36, 38, or the network basestation 40. A service provider operator may run a data rate scheduling application, embodied on a computer-readable medium, to modify or generate one or more data rate multiplier lookup tables according to various desired QOS metrics and/or custom scheduling criteria that are completely proprietary to the service provider.

Next, at block 54, data rate multiplier values are assigned to the data rate multiplier lookup table according to MCS type or SINR values. A service provider may use known channel MCS type and/or SINR values, to weight a particular data rate multiplier lookup table, such that when the lookup table is called for execution during a data rate assignment process, each client's particular MCS or SINR values will be referenced to a specific data rate multiplier value in the data rate lookup table. Then at block 56, the generated or modified data rate multiplier lookup table is saved at a controller device (e.g., within a memory of either network controller device 36, 38, or the network basestation 40) and associated with one or more channels of a network cell for future Max throughput determinations.

Figure 4:
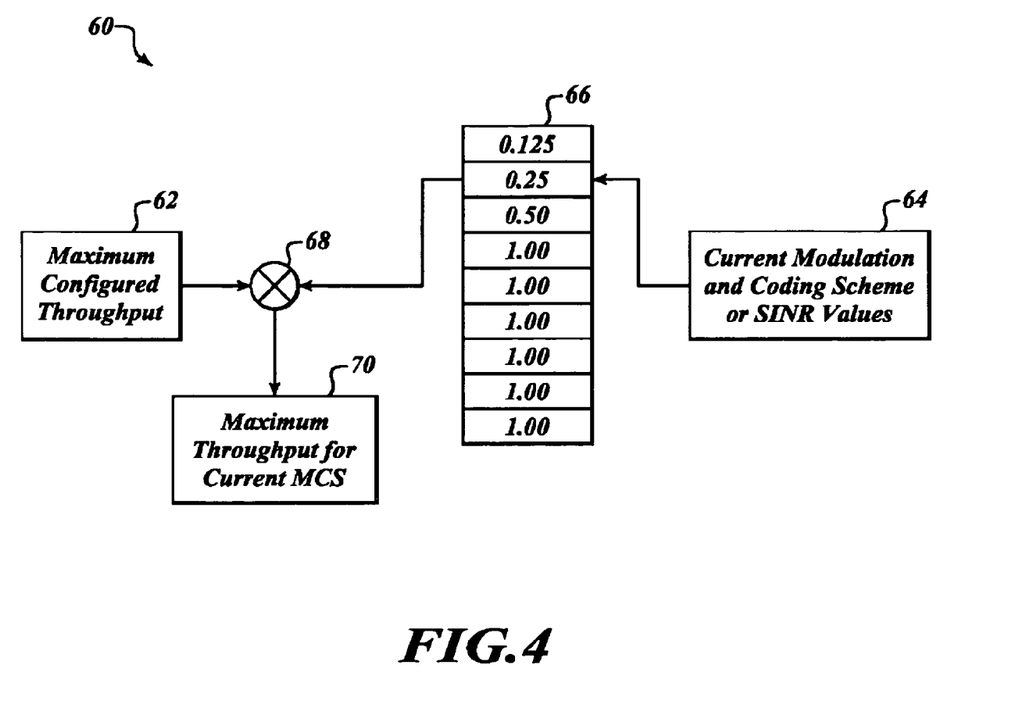
FIG. 4 illustrates a schematic of an MCS throughput determination in accordance with an embodiment of the present invention.

FIG. 4 illustrates a schematic 60 showing an embodiment of how a Max throughput assignment may be calculated for a particular channel using a generated data rate multiplier lookup table 66. In an embodiment, this process may be performed by a network controller device having data rate scheduling capabilities, including any of the network controller devices 36, 38, or the network basestation 40. At block 64 either a current MCS or a measured SINR value index is used as the index into the data rate multiplier lookup table 66. The schematic 60 shows an MCS or an SINR index pointing to a data rate multiplier value of 0.25. The data rate multiplier is then multiplied 68 with the Max configured throughput for the communications channel 62 to determine a Max throughput that should be used for a current MCS 70. In an embodiment, this calculation may be determined in real-time as each service flow is being scheduled.

Figure 5:
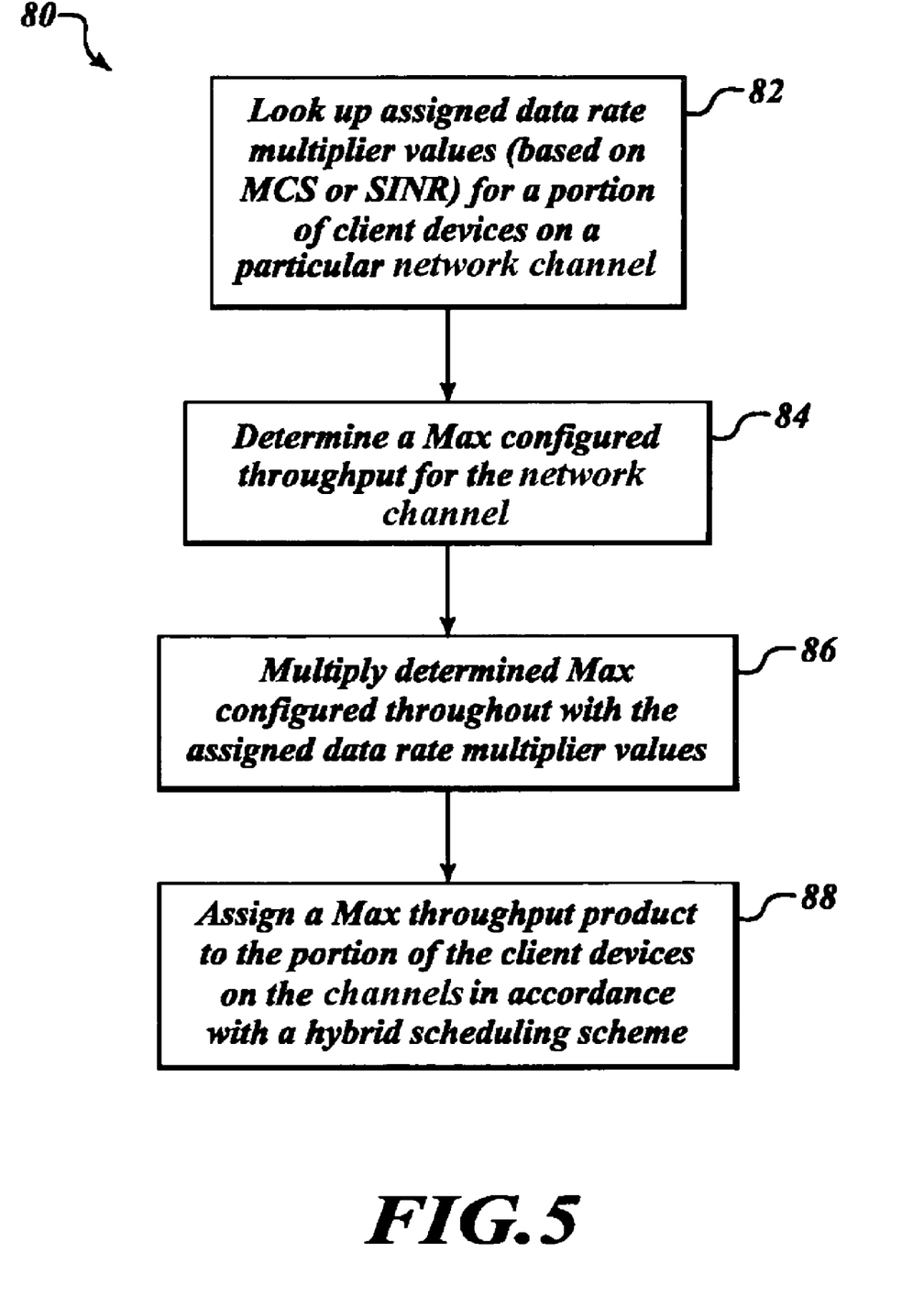
FIG. 5 illustrates a hybrid scheduling scheme flowchart process in accordance with an embodiment of the present invention.

FIG. 5 illustrates a hybrid scheduling scheme flowchart process 80 in accordance with an embodiment of the present invention. In an embodiment, this process may be performed by a network controller device having data rate scheduling capabilities, including any of the network controller devices 36, 38, or the network basestation 40. At block 82, data rate multiplier values are determined (e.g., looked up in a data rate multiplier lookup table) for a portion of client devices on a particular network channel. Next, at block 84, a Max configured throughput is determined for the channel. Then, at block 86 the Max configured throughput is multiplied with the assigned data rate multiplier values to determine a Max throughput product. At block 88, the Max throughput product is assigned to a portion of the client devices on the channel in accordance with the hybrid data rate scheduling scheme.

The present invention employs hybrid scheduling techniques to share bandwidth in a wireless communications system (e.g., a packet-switched network) with multiple distributed client devices 44a-d communicating with one or more network basestations 40 using multiple MCS levels. Generally a single throughput multiplier may be associated with each MCS level. A controller device (e.g., a scheduler device) allocates bandwidth resources such that the Max data throughput that a client device receives is equal to a maximum QOS agreement throughput, multiplied by the data rate multiplier value for the MCS that the client device is using at a particular time.

With the systems and methods of the present invention, a network service provider operator can configure a wireless communications system to allocate wireless channel resources on an equal-throughput basis, on an equal-bandwidth basis, or in a hybrid manner providing equal-throughput for service flows operating on a first group of MCS's and equal-bandwidth for a service flows operating on a second group of MCS's. This hybrid flexibility offers more customization for a service provider that may be faced with new and changing demands from its subscriber clientele. For purposes of example, Tables 2-3 are shown to illustrate data rate multiplier assignments under both the equal-throughput and an equal-bandwidth scenario. It would be understood by those skilled in the art that there are several distinct disadvantages associated with either scenario which makes a hybrid data rate scheduling scenario more desirable for real-world applications.

Table 2 shows how the throughput multipliers can be configured to make the scheduler operate as an equal-throughput scheduler. In this case, each distributed client device is able to operate at 100% of a peak service rate independent of the link quality and MCS.

TABLE 2

| Modulation and Coding Scheme | Data Rate Multiplier |
|---|---|
| QPSK-1/12 | 1.000 |
| QPSK-1/8 | 1.000 |
| QPSK-1/4 | 1.000 |
| QPSK 1/2 | 1.000 |
| QPSK 3/4 | 1.000 |
| 16-QAM 1/2 | 1.000 |

TABLE 2-continued

| Modulation and Coding Scheme | Data Rate Multiplier |
|---|---|
| 16-QAM 3/4 | 1.000 |
| 64-QAM 2/3 | 1.000 |
| 64-QAM 3/4 | 1.000 |
| 64-QAM 5/6 | 1.000 |

Table 3 shows how the data rate multipliers can be configured to make a network controller device operate as an equal-bandwidth scheduler. In this case, the data rate multiplier values are proportional to the data rates of each MCS level. Distributed client devices operating at the most efficient MCS of 64-QAM 5/6 may be able to transfer data at 100% of a peak service rate. Distributed client devices operating at the least efficient MCS of QPSK-1/12 may only be able to transfer data at 3.3% of a peak service rate.

TABLE 3

| Modulation and Coding Scheme | Data Rate Multiplier |
|---|---|
| QPSK-1/12 | 0.033 |
| QPSK-1/8 | 0.050 |
| QPSK-1/4 | 0.100 |
| QPSK 1/2 | 0.200 |
| QPSK 3/4 | 0.300 |
| 16-QAM 1/2 | 0.400 |
| 16-QAM 3/4 | 0.600 |
| 64-QAM 2/3 | 0.800 |
| 64-QAM 3/4 | 0.900 |
| 64-QAM 5/6 | 1.000 |

Table 4 shows a hybrid intermediate scenario that combines properties of the equal-throughput and the equal-bandwidth scheduling scenarios. In this scenario, a 16-QAM and a 64-QAM MCS may be scheduled to provide equal-throughput, whereas the QPSK MCS may be scheduled to provide equal-bandwidth. This particular scenario may be employed according to various desired service provider QOS metrics and/or custom scheduling criteria that are completely proprietary to a particular service provider.

TABLE 4

| Modulation and Coding Scheme | Data Rate Multiplier |
|---|---|
| QPSK-1/12 | 0.083 |
| QPSK-1/8 | 0.125 |
| QPSK-1/4 | 0.250 |
| QPSK 1/2 | 0.500 |
| QPSK 3/4 | 0.750 |
| 16-QAM 1/2 | 1.000 |
| 16-QAM 3/4 | 1.000 |
| 64-QAM 2/3 | 1.000 |
| 64-QAM 3/4 | 1.000 |
| 64-QAM 5/6 | 1.000 |

Tables 5-7 show how an average throughput can change as different sets of data rate multipliers are utilized within a data rate multiplier lookup table for a particular channel. In Table 5, all data rate multipliers are set to a value of 1.00, resulting in equal-throughput. The average throughput in this case is 1.64 bits/symbol.

TABLE 5

| Modulation and Coding Scheme | MS Modulation Distribution | Data Rate Multiplier | Modulation Distribution |
|---|---|---|---|
| QPSK-1/12 | 0.96% | 1.000 | 9.49% |
| QPSK-1/8 | 2.82% | 1.000 | 18.57% |
| QPSK-1/4 | 4.78% | 1.000 | 15.71% |
| QPSK 1/2 | 7.15% | 1.000 | 11.76% |
| QPSK 3/4 | 7.78% | 1.000 | 8.52% |
| 16-QAM 1/2 | 13.01% | 1.000 | 10.69% |
| 16-QAM 3/4 | 15.98% | 1.000 | 8.76% |
| 64-QAM 2/3 | 7.63% | 1.000 | 3.13% |
| 64-QAM 3/4 | 7.01% | 1.000 | 2.56% |
| 64-QAM 5/6 | 32.88% | 1.000 | 10.81% |
| Total | 100.00% | Average Throughput (bps) | 1.64 |

In Table 6, the data rate multipliers are chosen to provide an equal-bandwidth scenario. The average throughput in this case is 3.22 bits/symbol, which is much higher than in the equal-throughput scheduling scenario. However, the users in the network may experience widely varying throughputs and will only achieve the Max throughput when they are using their highest order MCS.

TABLE 6

| Modulation and Coding Scheme | MS Modulation Distribution | Data Rate Multiplier | Modulation Distribution |
|---|---|---|---|
| QPSK-1/12 | 0.96% | 0.033 | 0.96% |
| QPSK-1/8 | 2.82% | 0.050 | 2.82% |
| QPSK-1/4 | 4.78% | 0.100 | 4.78% |
| QPSK 1/2 | 7.15% | 0.200 | 7.15% |
| QPSK 3/4 | 7.78% | 0.300 | 7.78% |
| 16-QAM 1/2 | 13.01% | 0.400 | 13.01% |
| 16-QAM 3/4 | 15.98% | 0.600 | 15.98% |
| 64-QAM 2/3 | 7.63% | 0.800 | 7.63% |
| 64-QAM 3/4 | 7.01% | 0.900 | 7.01% |
| 64-QAM 5/6 | 32.88% | 1.000 | 32.88% |
| Total | 100.00% | Average Throughput (bps) | 3.22 |

Table 7 shows the result of using a hybrid scheduling scenario. The average throughput is considerably more than in the equal-throughput scheduling scenario. In the hybrid scenario, all client devices that use 16-QAM or 64-QAM MCS are provided equal-throughput. Users with QPSK MCS are provided lesser, depending on their assigned coding rate.

TABLE 7

| Modulation and Coding Scheme | MS Modulation Distribution | Data Rate Multiplier | Modulation Distribution |
|---|---|---|---|
| QPSK-1/12 | 0.96% | 0.083 | 1.43% |
| QPSK-1/8 | 2.82% | 0.125 | 4.20% |
| QPSK-1/4 | 4.78% | 0.250 | 7.10% |
| QPSK 1/2 | 7.15% | 0.500 | 10.63% |
| QPSK 3/4 | 7.78% | 0.750 | 11.57% |
| 16-QAM 1/2 | 13.01% | 1.000 | 19.35% |
| 16-QAM 3/4 | 15.98% | 1.000 | 15.85% |
| 64-QAM 2/3 | 7.63% | 1.000 | 5.67% |
| 64-QAM 3/4 | 7.01% | 1.000 | 4.63% |
| 64-QAM 5/6 | 32.88% | 1.000 | 19.56% |
| Total | 100.00% | Average Throughput (bps) | 2.60 |

In another embodiment using data rate multipliers, if a network service provider operator decides that he or she does not want to offer the lowest MCS in the network, then the operator may set corresponding multiplier values for those MCS to zero, such that those schemes are effectively blocked from use. In this way an operator of a network service provider may dynamically control the throughput of each network channel and service flow.

In accordance with other embodiments, various scheduling and data rate limiting schemes of any of the above embodiments may take place on the client side at any of the distributed client devices 44*a-d*. This may occur on an uplink when a client device 44*a-c* is transmitting data to a cell base station 40 or to a network controller device 36, 38.

In other embodiments, the data rate multiplier lookup table application of a data rate multiplier value (in accordance with a particular MCS or SINR value) to a throughput associated with one or more communications channel MCS may be replaced by another data rate multiplier value assignment process without departing from the spirit and scope of the present invention. In an embodiment, a data rate multiplier value may be dynamically generated or altered and then applied to a throughput associated with one or more communications channel MCS in accordance with a particular MCS or SINR value. In accordance with this embodiment, a mathematical algorithm that may be executed within a computer executable process, can dynamically create or change a data rate multiplier value in accordance with a particular MCS or SINR value. The created or changed data rate multiplier value may then be multiplied 68 with a Max configured throughput for the communications channel 62 to determine a Max throughput that should be used for a current MCS 70. These alternate processes may replace the lookup table application of a data rate multiplier value in any of the above data rate scheduling processes of the present invention.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A data communications system comprising:
    at least one base station;
    at least one scheduler device; and
    a plurality of client devices in data communications with the scheduler device over a data communications network,
    wherein the data communication system provides a plurality of modulation and coding schemes (MCSs) for communication between the client devices and the base station, each MCS being assigned a data rate multiplier, the MCSs including a first MCS group and a second MCS group,
    wherein the scheduler device is configured to assign each client device with one of the MCSs for use in communication with the base station,
    wherein the first MCS group includes a plurality of MCSs that are assigned the same data rate multiplier so that the client devices that are assigned the MCSs in the first MCS group achieve equal throughput by operating at the same service rates, and
    wherein the second MCS group includes a plurality of MCSs that are assigned a plurality of data rate multipliers so that the client devices that are assigned the MCSs in the second MCS group achieve equal bandwidth,
    wherein the data rate multipliers assigned to the MCSs in the second MCS group are proportional to data rates of the second MCS group.

2. The data communications system of claim 1, wherein the scheduler device assigns each client device with a MCS based on a Signal to Interference plus Noise Ratio (SINR) value determined for that client device, and
    wherein the data rate multipliers assigned to the MCSs in the second MCS group are defined according to coding rates associated with those MCSs.

3. The data communications system of claim 1, wherein data rate multipliers are predetermined values.

4. The data communications system of claim 1, wherein the scheduler device is the base station or a network controller device connected to the base station.

5. A data communication system including a base station, a plurality of client devices, and a non-transitory computer-readable medium encoded with computer readable instructions, the computer-readable medium comprising:
    code for determining a Signal to Interference plus Noise Ratio (SINR) value for first and second client devices;
    code for assigning a modulation and coding scheme (MCS) to the first client device for use in communication with the base station based on the SINR value determined for the first client device, the MCS assigned to the first client device belonging to a first MCS group; and
    code for assigning a MCS to the second client device for use in communication with the base station based on the SINR value determined for the second client device, the MCS assigned to the second client device belonging to a second MCS group,
    wherein each MCS is assigned a data rate multiplier,
    wherein the first MCS group includes a plurality of MCSs that are assigned the same data rate multiplier so that the client devices that are assigned the MCSs in the first MCS group achieve equal throughput by operating at the same service rates, and
    wherein the second MCS group includes a plurality of MCSs that are assigned a plurality of data rate multipliers so that the client devices that are assigned the MCSs in the second MCS group achieve equal bandwidth,
    wherein the data rate multipliers assigned to the MCSs in the second MCS group are proportional to data rates of the second MCS group.

6. The computer-readable medium of claim 5, wherein values of the data rate multipliers assigned to the MCSs in the second MCS group correspond to coding rates associated with those MCSs.

7. The computer-readable medium of claim 5, wherein data rate multipliers are predetermined values.

8. A computer-implemented data rate scheduling method for a data communication system including a base station, a plurality of client devices, the computer-implemented method comprising:
    determining a Signal to Interference plus Noise Ratio (SINR) value for first and second client devices;
    assigning a modulation and coding scheme (MCS) to the first client device for use in communication with the base station based on the SINR value determined for the first client device, the MCS assigned to the first client device belonging to a first MCS group; and
    assigning a MCS to the second client device for use in communication with the base station based on the SINR value determined for the second client device, the MCS assigned to the second client device belonging to a second MCS group,
    wherein each MCS is assigned a data rate multiplier,
    wherein the first MCS group includes a plurality of MCSs that are assigned the same data rate multiplier so that the client devices that are assigned the MCSs in the first MCS group achieve equal throughput by operating at the same service rates, and wherein the second MCS group includes a plurality of MCSs that are assigned a plurality of data rate multipliers so that the client devices that are assigned the MCSs in the second MCS group achieve equal bandwidth, wherein the data rate multipliers assigned to the MCSs in the second MCS group are proportional to data rates of the second MCS group.

9. The computer-implemented method of claim 8, wherein values of the data rate multipliers assigned to the MCSs in the second MCS group correspond to coding rates associated with those MCSs.

10. The computer-implemented method of claim 8, wherein data rate multipliers are predetermined values.

* * * * *